United States Patent [19]
Yoshimaru et al.

[11] Patent Number: 5,101,392
[45] Date of Patent: Mar. 31, 1992

[54] INFORMATION RECORDING APPARATUS

[75] Inventors: Tomohisa Yoshimaru, Yokohama; Tsuneshi Yokota, Kawasaki, both of Japan

[73] Assignee: Kabushiki Kaisha Toshiba, Kawasaki, Japan

[21] Appl. No.: 438,075

[22] Filed: Nov. 20, 1989

[30] Foreign Application Priority Data

Nov. 21, 1988 [JP] Japan .............................. 63-293884
Nov. 21, 1988 [JP] Japan .............................. 63-293885

[51] Int. Cl.$^5$ .............................................. G11B 7/00
[52] U.S. Cl. ................................ 369/44.27; 369/44.32
[58] Field of Search ............... 369/44.25, 44.27, 44.29, 369/44.31, 44.32, 44.33, 116; 250/201.5

[56] References Cited

U.S. PATENT DOCUMENTS

| | | | |
|---|---|---|---|
| 4,512,003 | 4/1985 | Kimura et al. | 369/44.29 |
| 4,544,837 | 10/1985 | Tanaka et al. | 369/44.29 |
| 4,656,617 | 4/1987 | Nakatsuyama et al. | 369/44.29 |
| 4,703,466 | 10/1987 | Konno | 369/44.29 |
| 4,773,052 | 9/1988 | Sugiura et al. | 369/44.27 |
| 4,998,233 | 3/1991 | DiMatteo et al. | 369/44.27 |
| 5,003,521 | 3/1991 | Yoshida et al. | 369/44.27 |
| 5,020,045 | 5/1991 | Smart et al. | 369/44.29 |

FOREIGN PATENT DOCUMENTS

| | | |
|---|---|---|
| 0070552 | 1/1983 | European Pat. Off. . |
| 0083452 | 7/1983 | European Pat. Off. . |
| 3541002 | 5/1986 | Fed. Rep. of Germany . |

Primary Examiner—Donald McElheny, Jr.
Attorney, Agent, or Firm—Finnegan, Henderson, Farabow, Garrett and Dunner

[57] ABSTRACT

Prior to emitting a light beam from an optical head, an information recording apparatus moves the optical head in the direction of the optical axis so as to render the light beam in a defocused state on an optical recording medium. Then, the size of the emitted light beam is detected by a detector.

7 Claims, 3 Drawing Sheets

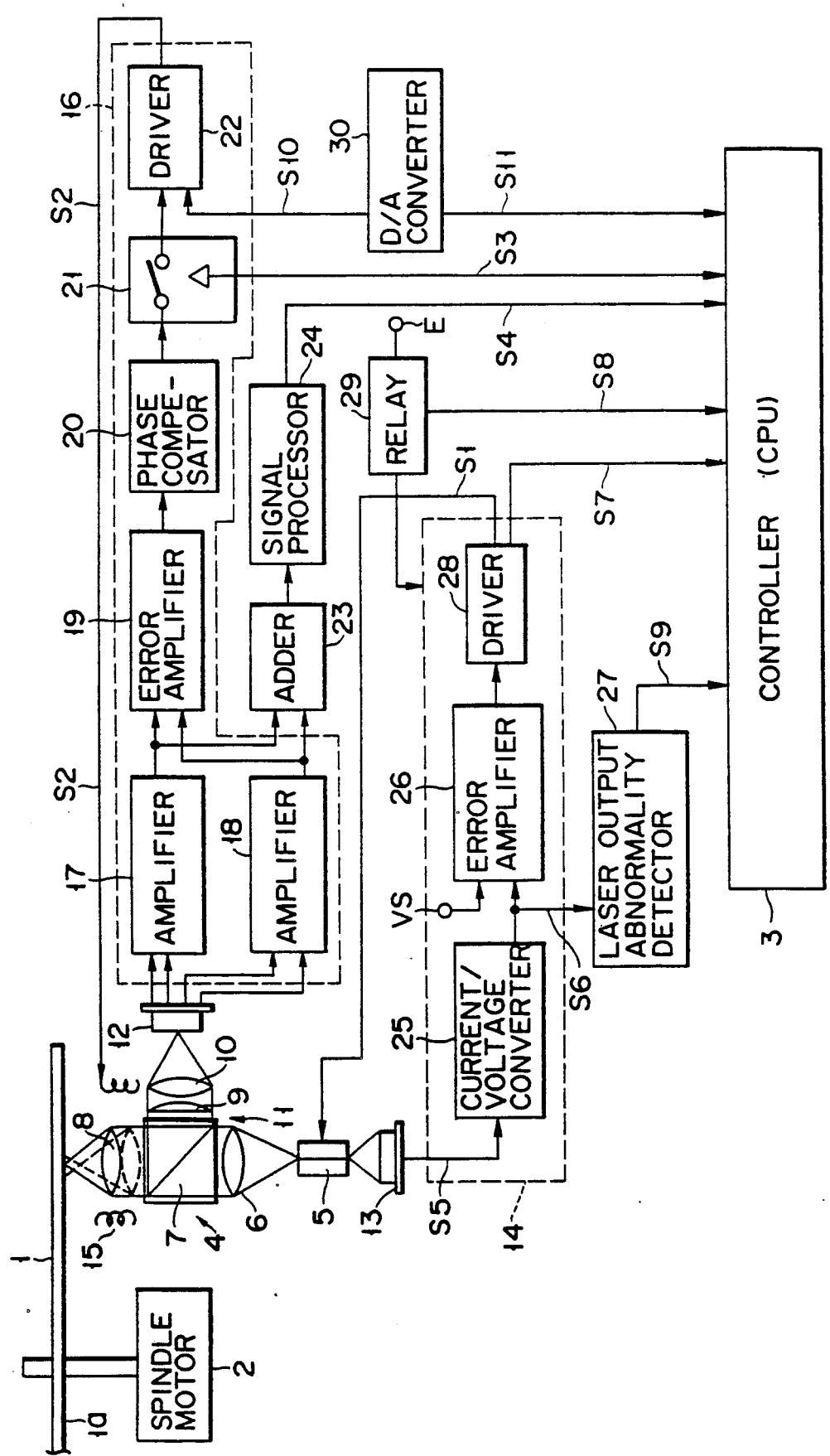
F I G. 1

INFORMATION RECORDING APPARATUS

BACKGROUND OF THE INVENTION

1. Field of the Invention

The present invention relates to an information recording apparatus for executing data recording and reproducing with respect to an optical recording medium such an optical disk, and more particularly, to an information recording apparatus capable of checking if abnormal light is generated due to malfunction of an optical output controller itself.

2. Description of the Related Art

Conventionally, according to an information recording apparatus such as an optical disk device which optically records or reproduces data onto or from an optical recording medium such as a writable or erasable optical disk, data on the optical disk is read out by using a relatively small optical output from a semiconductor laser (optical outputting means) serving as a light source, and data is read out from the optical disk by using a relatively large optical output having a level greater than a predetermined value. When an optical output having a level greater than a predetermined value is irradiated onto an optical disk even if it is not intended for data recording, therefore, undesired data may be written and data already written would be destroyed. Further, if the level of an optical output used for data recording is greater than a predetermined level, an optical disk may be damaged by the optical output.

There are systems which are equipped with a double recording preventing circuit (as disclosed in the Published Unexamined Japanese Patent Application No. 54-147006, for example) which prevent destroying of data recorded on an optical disk or damaging of the disk, or which generate a laser beam if and only if an optical disk is loaded and rotated to prevent the optical disk from being damaged as disclosed in the Published Unexamined Utility Model Application No. 57-56343.

However, such systems or measures to prevent destroying of data recorded on an optical disk or damaging of the optical disk are not particularly designed to prevent the optical disk from being damaged by generation of an abnormal optical output due to malfunction or damaging of an optical output controller itself. When this controller is damaged, therefore, damaged on the optical disk may be destroyed or the optical disk itself may be damaged.

Even though an abnormal optical output, when carelessly irradiated on an optical disk for data recording, is likely to destroy the recorded data, no measures have been taken to check whether the optical output for data recording is correct. With respect to an optical output for data reproduction, the level is relatively small so that its is generally checked. However, the optical output may be continuously incorrect due to damage or malfunction of the optical output controller itself, thus generating an abnormal optical output.

SUMMARY OF THE INVENTION

To solve the above problems, therefore, it is an object of this invention to provide an information recording apparatus which can detect generation of an abnormal optical output at the time of either data reproduction or data recording due to damaging of an optical output controller for controlling optical outputting means, to thereby prevent data recorded on an optical recording medium from being destroyed or the recording medium from being damaged and to ensure stable data recording and data reproduction.

To achieve this object, an information recording apparatus according to the present invention comprises optical outputting means for irradiating a light beam to an optical recording medium, focusing means for focusing the irradiated light beam on the optical recording medium, moving means for moving the focusing means in an optical axial direction thereof, means for performing such a control as to cause the optical outputting means to irradiate a light beam after permitting the moving means to move the focusing means to render the light beam on the optical recording medium in a defocused state; and detecting means for detecting presence or absence of abnormality of the irradiated light beam while said light beam is irradiated on said optical recording medium in a defocused state.

With the above arrangement, even if the light output controller is damaged and data is being reproduced from or recorded on an optical recording medium, the present information recording apparatus can prevent data on the optical recording medium from being destroyed or prevent the recording medium from being damaged.

BRIEF DESCRIPTION OF THE DRAWINGS

FIG. 1 is a block diagram illustrating the circuit arrangement of an optical disk apparatus according to one embodiment of the present invention;

DETAILED DESCRIPTION OF THE PREFERRED EMBODIMENTS

Figure 2:
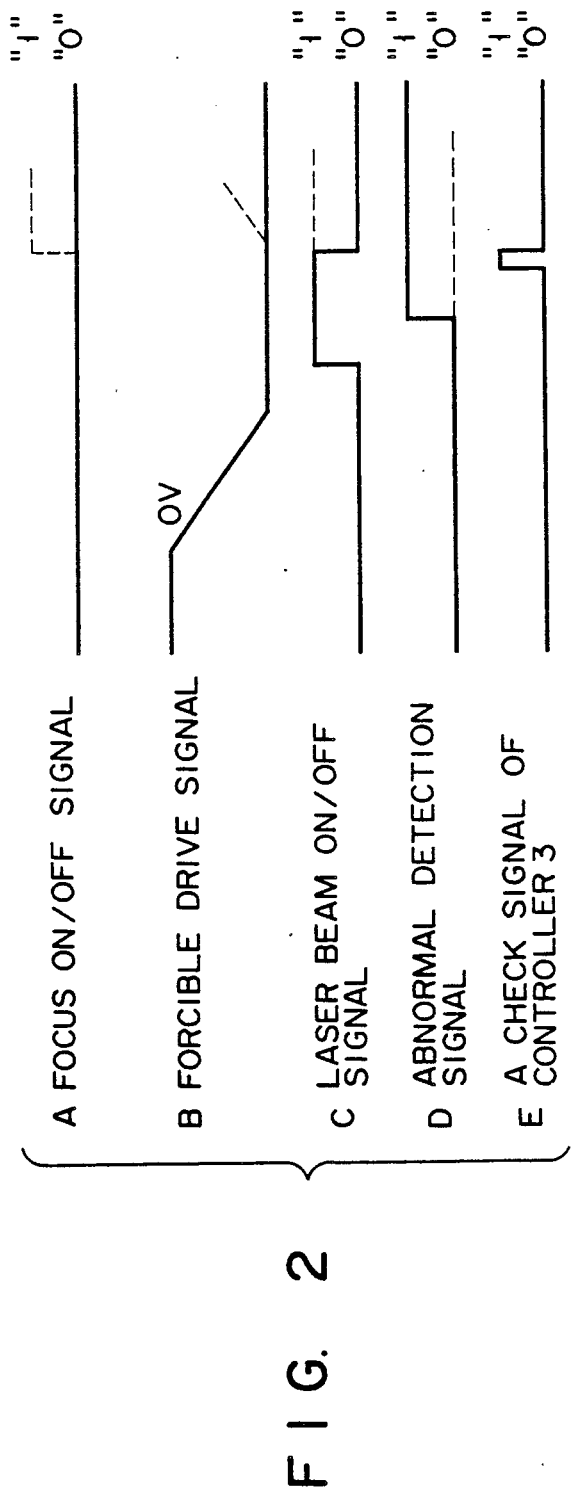
FIGS. 2A to 2E are timing charts for explaining the operation of the circuit shown in FIG. 1.

FIG. 1 schematically illustrates the arrangement of an optical disk apparatus serving as an information recording apparatus according to the present invention. An optical disk (optical recording medium) 1 is constituted by coating a metal film layer, made of tellurium, bismuth or the like, in doughnut shape on the surface of a substrate made of glass, plastic or the like and molded into a disk-shape.

The optical disk 1 is rotated by a spindle motor 2. The driving of the motor 2 is controlled by a motor controller (not shown) which functions in accordance with a control signal from a controller 3.

The controller 3, which comprises a microcomputer, for example, performs various controls (to be described later) including the rotational control of the spindle motor 2.

Under the optical disk 1 lies an optical head 4 which executes data recording on and data reading from the optical disk 1. The optical head 4 comprises a non-point aberration optical system 11, a quarter light detector 12 and a photosensor 13. The optical system 11, which is well-known, includes a semiconductor laser oscillator 5, a collimator lens 6, a deflected-beam splitter 7, an objective lens 8, a cylindrical lens 9 and a convex lens 10. The optical head 4 is disposed movable in a radial direction of the optical disk 1 by means of a moving mechanism (not shown) constituted mainly by a linear motor, for example. The head 4 is moved to a target track for data recording or data reproduction in accordance with a command from the controller 3.

The semiconductor laser oscillator (optical outputting means) 5 generates a divergent laser beam (light beam) in accordance with a drive signal S1 from an optical output controller 14. This oscillator 5 generates a strong laser beam, whose intensity is changed in accordance with data to be recorded when the data is recorded on a recording film 1a of the optical disk 1, and generates a weak laser beam having a constant intensity when data is read out from this recording film 1a.

The divergent laser beam from the semiconductor laser oscillator 5 is converted into parallel light beams by the collimator lens 6, and the parallel beams are guided to the deflected-beam splitter 7. After passing the splitter 7, the parallel beams enter the objective lens 8 which in turn converges the received beams onto the recording film 1a of the optical disk 1.

The objective lens (focusing means) 8 is supported movable in the direction of the optical axis, by a lens actuator (moving means) 15 serving as a lens driving mechanism. The converging laser beam, having passed the objective lens 8 moved in the optical axial direction by a servo signal S2 from a focus servo circuit 16, is irradiated onto the surface of the recording film 1a, and minute or fine beam spots are formed on this recording film 1a. Under, this circumstance, the objective lens 8 becomes focused.

The objective lens 8 is movable in a direction perpendicular to the optical axis by a servo signal from a tracking servo circuit (not shown). The convergent laser beam after passing the objective lens 8 is irradiated onto recording tracks formed on the surface of the recording film 1a. In this state, the objective lens 8 is in a track-matched state. Data writing and data reading executed in the above focused state and track-matched state.

In focused state, a divergent laser beam reflected from the recording film 1a is converted into parallel beams by the objective lens 8 and the parallel beams are returned to the deflected-beam splitter 7. The beams are reflected by the splitter 7, then guided to the detector 12 by the non-point aberration optical system 11, comprising the cylindrical lens 9 and convex lens 10, whereby the beams converge in a state where defocusing appears as a change in shape.

The detector 12 includes four photosensing cells which convert beams, converged by the optical system 11, into electrical signals. Two pairs of signals, each pair output from diagonally arranged two photosensing cells of the detector 12, are respectively supplied to amplifiers 17 and 18 of the focus servo circuit 16.

The focus servo circuit 16 further comprises an error amplifier 19, which receives two amplified signals from the amplifiers 17 and 18 for error amplification, a phase compensator 20 for compensating the phase of the output signal of this error amplifier 19, and an analog switch 21 operable to permit the output signal of this compensator 20 to be supplied to a driver 22 which is also a constituting element of the circuit 16. When this analog switch 21 is set ON by a focus ON/OFF signal S3 from the controller 3, the signal from the phase compensator 20 is supplied via the driver 22 to the actuator 15, thereby forming a servo loop.

The output signals of the amplifiers 17 and 18 are supplied to an adder 23, and the result of addition performed in the adder is sent to a signal processor 24. This signal processor 24 performs binary processing of the photoelectrically-converted signals from the detector 12. A binary signal from the signal processor 24 reflects the recorded contents of the optical disk 1, and is sent as a reproduction signal S4 to the controller 3.

The photosensor 13 is constituted by a photoelectric converting element such as a protodiode provided to face a light-emitting port of the semiconductor laser oscillator 5 opposite the other light-emitting port that emits a laser beam for data recording or data reproduction. Upon reception of monitor light from the oscillator 5, the photosensor 13 converts this light into an electrical signal (light current) and sends the signal to the optical output controller 14 as an optical output monitor signal S5 of the oscillator 5. The optical output controller 14 executes a feedback control based on the semiconductor laser oscillator 5 to thereby maintain the optical output of the oscillator 5 constant.

The current/voltage converter 25 receives the signal S5 which is the current signal acquired by the photoelectric conversion performed by the photosensor 13 and converts the signal S5 into a voltage signal S6 according to the intensity of the light received by the photosensor 13 or the optical output of the semiconductor laser oscillator 5

Figure 5:
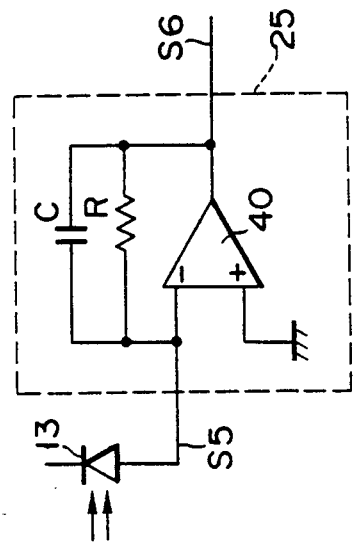
FIG. 5 is a diagram exemplifying the circuit configuration of a current/voltage converter as shown in FIG. 1.

The current/voltage converter 25 is constituted as shown in FIG. 5. That is, the converter 25 comprises an operational amplifier 40 having an inverting input terminal (−) supplied with the signal S5 from the photosensor 13 and a non-inverting input terminal (+) grounded, a resistor R and a capacitor C, the last two being inserted in parallel between the inverting input terminal and output terminal of the amplifier 40. Thus constituted current/voltage converter 2 smooths the signal S5 from the photosensor 13 and outputs the resultant signal as an averaged value. The voltage signal S6 output from the converter 25 is supplied to an error amplifier 26 and a laser output abnormality detector 27.

The amplifier 26 receives the voltage signal S6 as one input and a reference voltage $V_S$ generated from a constant voltage source (not shown) as the other input, and compares these voltages S6 and $V_S$ with each other. The amplifier 26 then amplifies the resultant voltage difference and sends it as an error signal to the driver 28. The reference voltage $V_S$ is a constant voltage serving to provide the necessary optical output for data reproduction. The signal S1 is output from the driver 28 in such a way as to cause the voltage signal S6 to approach the reference voltage $V_S$ in feedback control. This feedback control provides a constant optical output from the semiconductor laser oscillator 5. To realize the feedback, the error signal from the error amplifier 26 is supplied to the driver 28.

The driver 28 receives a recording pulse signal S7 from the controller 3, which is associated with data to be recorded. This signal S7 permits the signal S1 to be output from the driver 28 to the semiconductor laser oscillator 5. As a result, the oscillator 5 outputs a laser beam for data recording. The driver 28 receives a voltage signal from the error amplifier 26 at the time of data reproduction and receives a voltage signal held in a sample and hold circuit (not shown at the time of data recording, the latter signal being a voltage which has been input at the time of immediately preceding data reproduction. These two signals are switched to one another depending on whether data recording or reproduction is executed. In both recording and reproducing data, feedback control is performed with the level of an optical output provided at the time of data reproduction.

A relay circuit 29 controls the permission and inhibition of the supply of a voltage E from a voltage source (not shown) to the optical output controller 14. The opening/closing of this circuit 29 is controlled based on a laser beam ON/OFF signal S8 from the controller 3.

The laser output abnormality detector (detecting means) 27 monitors the voltage signal S6 from the current/voltage converter 25. Upon detection of this voltage signal S6 exceeding a preset change allowable range, i.e., upon detection of abnormality, the converter 25 outputs an abnormal detection signal S9 to that effect to the controller 3. Upon reception of this signal S9, the controller 3 outputs the laser beam ON/OFF signal S8 to enable the relay circuit 29 to thereby cut off the source voltage E to the optical output controller 14.

A D/A converter 30 produces a forcible drive signal S10 to enforce the objective lens 8 in defocused state. In enforcing the objective lens 8 in defocused state, the analog switch 21 is set OFF to cut off the focus servo loop, and a predetermined digital signal S11 is supplied to the D/A converter 30 from the controller 3 to be converted into an analog signal. This analog signal is supplied as the forcible drive signal S10 to the driver 22 whose output drives the lens actuator 15 to forcibly move the objective lens 8 downward or in the direction away from the optical disk 1 as indicated by the dotted line in FIG. 1.

Figure 3:
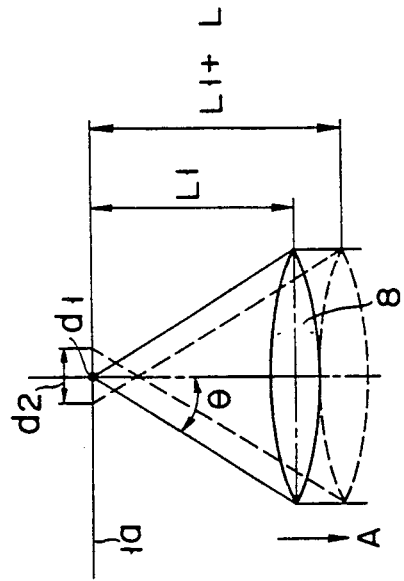
FIG. 3 is a diagram for explaining how to set a light beam in defocused state by moving focusing means.

Referring now to FIG. 3, a description will now be given of the energy density of a beam spot formed on the optical disk 1 with the objective lens 8 being in defocused state.

In general, the number of apertures, NA, of the objective lens 8 is expressed by $NA = \sin \theta$ where $\theta$ is an angle defined by the optical axis and a line connecting the periphery of the objective lens 8 and its focus point. The number of aperture NA is generally set to be 0.5 to 0.55 for a recording/reproducing optical disk apparatus. With the wavelength of the light from the semiconductor laser oscillator 5 being about 800 nm, the diameter of a spot, $d_1$ on the recording film 1a of the optical disk 1 becomes about 1 μm at the focused time.

In reproducing data from the optical disk 1, a laser beam having power of about 1 mW is irradiated on the optical disk 1. At the time of data recording, however, a laser beam irradiated on the disk 1 to form pits has power of about 10 mW.

With the focus distance of the objective lens 8 being $L_1$, if the lens 8 is shifted (or defocused) by $\Delta L$ from the focused state in the direction of the arrow A in FIG. 3, the light converged by the lens 8 has an optical path as indicated by the dotted lines. Given that the shifted distance $\Delta L = 0.1$ mm and the number of aperture $NA = 0.5$, the diameter $d_2$ of a beam spot on the recording film 1a of the optical disk 1 can be expressed as follows:

$$d_2 = 2 \times \Delta L \times \tan \theta \quad (1)$$

Since $NA = \sin \theta = 0.5$, $\theta = 30°$. Thus, $d_2 = 2 \times 0.1 \times \tan 30° = 0.115$ mm.

The energy density of the beam spot on the recording film 1a at that time is expressed in terms of an area ratio with respect to $d_1 = 0.1$ μm, which is the diameter of the beam spot in focused state. Therefore, it becomes:

$$(d_1/d_2)^2 = \{1/(0.115 \times 1000)\}^2$$
$$\approx 1/10000.$$

In other words, if the objective lens 8 with $NA = 0.5$ is defocused by 0.1 mm from the focused state, the laser power density on the recording film 1a of optical disk 1 becomes 1/100000 or below. If the power of a laser beam used for data recording is 10 mW, therefore, it corresponds to 1 μW in the defocused state, which is very small, one thousandth or less of the ordinary reproducing laser power of 1 mW. Such a small laser power does not damage the recording film 1a of the optical disk 1, nor does it destroy data already written on the film 1a.

The following will describe the arrangement for moving the objective lens 8 by 0.1 mm only in order to create the aforementioned defocused state. The standard of the surface deflection of the optical disk 1 of, for example, 5-inch type, is determined by the ISO standards, and the standard of the amount of the surface deflection of an 8-inch or 12-inch optical disks is also determined in compliance with that of the 5-inch disks.

In the optical disk apparatus, with respect to the surface deflection of the optical disk 1, the objective lens 8 supported by the lens actuator 15 is moved to follow up the deflection by the servo signal S2 from the focus servo circuit 16, so that the lens 8 is always in focused state. In this respect, the range of movement of the objective lens 8 permitted by the lens actuator 15 is generally set to be twice or more of the maximum surface deflection of the optical disk 1. Therefore, the structure shown in FIG. 1 can easily realize such an arrangement to forcibly move the objective lens 8 to satisfy the condition of the following equation (2):

$$\text{Amount of forced defocus} > \quad (2)$$
$$(\text{Maximum surface deflection} + 0.1 \text{ mm})$$

For instance, as the maximum surface deflection for 5-inch optical disks is specified to be ±0.3 mm, the range of movement of the objective lens 8 permitted by the lens actuator 15 is generally set to be ±0.6 mm or above. Therefore, it is possible to sufficiently ensure 0.1 mm space which allows the objective lens 8 to move to realize the defocused state.

The following will describe how to activate the semiconductor laser oscillator 5 of the optical disk apparatus having the above structure, referring now to the timing charts given in FIGS. 2A to 2E.

Prior to setting the semiconductor laser oscillator 5 ON, the focus ON/OFF signal S3 of a low level ("0") is output from the controller 3 as shown in FIG. 2A to turn off the analog switch 21. As a result, the focus servo loop is cut off, and the objective lens 8 becomes free from the focusing control. Then, the digital signal S11 for forcibly moving the lens actuator 15 is output from an internal CPU of the controller 3. This digital signal S11 is converted by the D/A converter 30 into an analog signal, which is in turn supplied as the forcible drive signal S10 to the lens actuator 15 via the driver 22 as shown in FIG. 2B. Consequently, the objective lens 8 is enforced to move by a distance ($\Delta L$ in FIG. 3)

corresponding to the value of the digital signal S11, thus creating a defocused state.

Subsequently, in the above defocused state, the laser beam ON/OFF signal S8 of a high level ("1") is output from the controller 3 as shown is FIG. 2C to close the contact of the relay circuit 29. This permits the source voltage E to be supplied to the optical output controller 14, so that the semiconductor laser oscillator 5 is activated to start emitting a laser beam.

The monitor beam generated from the semiconductor laser oscillator 5 when activated is converted into a current corresponding to the optical output by the photosensor 13, and this current signal is supplied as the optical output monitor signal S to the current/voltage converter 25. This converter 25 converts the signal S5 into the voltage signal S6 as an average of the optical output and sends it to the error amplifier 26 and laser output abnormality detector 27.

The error amplifier 26 compares the received voltage signal S6 with a preset reference voltage $V_S$ and outputs the difference as an error signal. This error signal serves to reduce the optical output of the semiconductor laser oscillator 5 for the voltage signal S6 greater than the reference signal $V_S$ and to increase this optical output for the former signal S6 smaller than the latter. This feedback control permits the voltage signal S6 to be equal to the reference voltage $V_S$ to thereby provide a constant optical output from the semiconductor laser oscillator 5.

A description will now be given of a case where it is detected whether or not a reproduction optical output is abnormal.

Upon judging that the present optical disk apparatus is in a mode of generating a reproduction optical output, the laser output abnormality detector 27 checks if the received voltage signal S6 is within a given range with respect to a voltage corresponding to a 1-mW optical output. If the signal S6 is out of this range, the detector 27 sends the abnormal detection signal S9 representing this event to the controller 3, as shown in FIG. 2D. The controller 3 checks the presence or absence of this signal S9 at a given timing (e.g., the one shown in FIG. 2E). If the signal S9 is at a high level of "1," the controller 3 sets the level of the laser beam ON/OFF signal to low ("0") to open the contacts of the relay circuit 29, thereby stopping the supply of the source voltage E to the optical output controller 14. The above operation prevents destruction of data recorded on the optical disk 1 even if a reproduction optical output is abnormal.

A description will now be given determining when a recording optical output is abnormal.

Upon judging that the reproduction optical output is within the given range or that the abnormal detection signal S9 is not at a high level of "1" at the aforementioned given timing, the controller 3 sends the recording pulse signal S7 of a constant period (see FIG. 4A) to the driver 28. The driver 28 superimposes this signal S7 on the signal from the error amplifier 26 for reproduction optical output, and sends the resultant signal as the drive signal S1 to the semiconductor laser oscillator 5. As a result, the oscillator 5 produces an optical output which is ON or OFF in accordance with the aforementioned recording pulse signal S7. At that time, the monitor beam generated from the oscillator 5 is also rendered ON or OFF in the above-mentioned manner. This monitor beam is photoelectrically converted by the photosensor 13, and the resultant electric signal is supplied to the current/voltage converter 25. As a result, the converter 25 provides the voltage signal S6 representing an average of the recording optical output.

Figure 4:
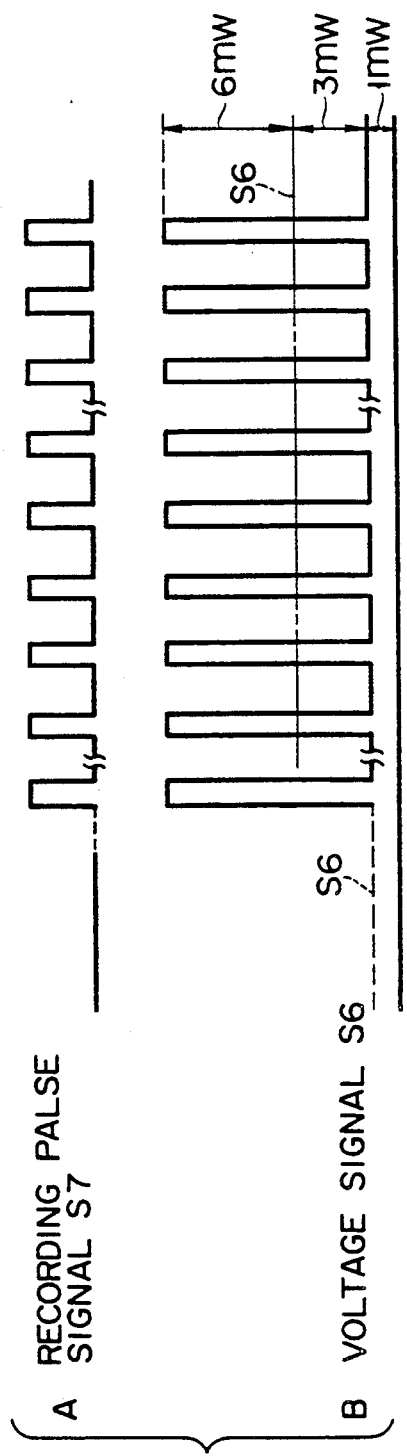
FIGS. 4A and 4B are diagrams illustrating signal waveforms used in detecting the abnormality of a light beam.

Given that the maximum power of the recording laser beam generated from the semiconductor laser oscillator 5 according to the pulse signal S7 is 10 mW and the pulse duty is 30 %, the average value of the output from the current/voltage converter 25 is 4 mW as shown in FIG. 4B. Upon judging that the present optical disk apparatus is in a mode of generating a recording optical output, the laser output abnormality detector 27, supplied with the voltage signal S6, determines if this signal S6 is within a given range with respect to a voltage corresponding to a 4-mW optical output. If the signal S6 is out of this range, the detector 27 sends the abnormal detection signal S9 representing this event to the controller 3, as shown in FIG. 2D. The controller 3 checks the presence or absence of this signal S9 at a given timing. If the signal S9 is at a high level of "1," the controller 3 sets the level of the laser beam ON/OFF signal to low ("0") to open the contacts of the relay circuit 29, thereby stopping the supply of the source voltage E to the optical output controller 14. The above operation can prevent destruction of data recorded on the optical disk 1 even if abnormality occurs during generation of the recording optical output, and can also ensure stable data recording on the optical disk 1.

If it is judged by the above sequence of operations that the reproduction and recording optical outputs are satisfactory, the controller 3 outputs the digital signal S11 as well as a reproduction laser beam, as indicated by the dotted lines in FIGS. 2A to 2E, to drive the actuator 15 through the D/A converter 30 and driver 22. Driving the actuator 15 moves the objective lens 8 in the direction of the focus position. When it is determined that the lens 8 has reached the focus position, the analog switch 21 is turned on to connect the focus servo loop. Thereafter, automatic focus control is executed by the focus servo loop, and a normal operation, such as data reading from or data writing on the optical disk 1, will be performed.

As described above, prior to emitting a laser beam from the semiconductor laser oscillator 5, the objective lens 8 is forcibly moved in the direction of the optical axis of the lens 8 by the lens actuator 15 to thereby set a defocused state on the optical disk 1. Then, the laser beam is irradiated on the optical disk 1 from the oscillator 5. This method distributes optical energy on the optical disk 1, so that even an abnormal optical output is produced from the oscillator 5 due to malfunction of the optical output controller 14, it is possible to prevent destruction of data recorded on the optical disk 1 as well as damaging the disk 1.

The optical output of the semiconductor laser oscillator 5 is checked in the aforementioned defocused state by the laser output abnormality detector 27, and if the check result is within a predetermined value, the focus servo control is initiated, and if the result is output of the predetermined value, irradiation of a laser beam form the oscillator 5 is stopped. This system can ensure checking of the size of the laser beam from the oscillator 5 while preventing data recorded on the optical disk 1 from being destroyed and the optical disk 1 itself from being damaged. It is therefore possible to surely check the occurrence of abnormality and permit the optical disk apparatus to stably function.

Although the objective lens 8 is moved in the direction away from the optical disk 1 to create a defocused state in the above embodiment, the lens 8 may be moved in the direction closer to the disk 1. In this case, the same effects as obtained in the above embodiment can be provided.

Although the foregoing description has been given with reference to the embodiment being applied to an optical disk apparatus, the present invention is in no way restricted to this particular embodiment, but can be widely applied to apparatus which optically record and reproduce data using light energy.

What is claimed is:

1. An information recording apparatus comprising:
   an optical recording medium;
   light outputting means for irradiating a light beam to the optical recording medium;
   focusing means for focusing the irradiated light beam on the optical recording medium;
   moving means for moving the focusing means, before the light beam is irradiated, in an optical axial direction thereof to a position in which the irradiated light beam is turned on in a defocused state on the optical recording medium;
   detecting means for detecting a presence or an absence of abnormality of the irradiated light beam while the light outputting means irradiates the light beam on the optical recording medium after the focusing means is in a defocused state; and
   control means for stopping the irradiation of the light beam when the detecting means detects the presence of an abnormality in the irradiated light beam, and controlling the moving means to return the focusing means to a position in which the irradiated light beam is in a focused state on the optical recording medium when the detecting means detects the absence of an abnormality in the irradiated light beam.

2. An information recording apparatus according to claim 1, wherein the detecting means includes means for determining a size of a light beam emitted from the light outputting means in a defocused state.

3. An information recording apparatus according to claim 1, further comprising control means for executing initiation of a focus servo control upon determining that the size of the light beam detected by the detecting means is within a predetermined value.

4. An information recording apparatus according to claim 1, further comprising control means for inhibiting emission of the light beam from said light outputting means upon determining that the size of the light beam detected by the detecting means is out of a predetermined value.

5. An information recording apparatus according to claim 1, wherein the light outputting means includes means for emitting a recording light beam, and the detecting means includes means for determining the presence or absence of abnormality of the recording light beam emitted for the light outputting means.

6. An information recording apparatus according to claim 5, wherein the recording light beam from the light outputting means has a pulse form with a constant period.

7. An information recording apparatus according to claim 5, further comprising average generating means, coupled between the light outputting means and the detecting means, for producing an average of a size of the pulse recording light beam having the constant period and inputting the average to the detecting means.

* * * * *

UNITED STATES PATENT AND TRADEMARK OFFICE
CERTIFICATE OF CORRECTION

PATENT NO. : 5,101,392
DATED : March 31, 1992
INVENTOR(S) : TOMOHISA YOSHIMARU ET AL.

It is certified that error appears in the above-indentified patent and that said Letters Patent is hereby corrected as shown below:

Claim 1, column 9, line 28, after "means is" insert
--moved by the moving means so that the focusing means is--.

Signed and Sealed this

Fourteenth Day of December, 1993

Attest:

BRUCE LEHMAN

Attesting Officer   Commissioner of Patents and Trademarks